(12) United States Patent
Decker et al.

(10) Patent No.: US 8,715,582 B1
(45) Date of Patent: May 6, 2014

(54) APPARATUS AND METHOD FOR PRODUCING ACTIVATED CARBON

(76) Inventors: Earl R. Decker, Ontario (CA); Walter David Hemenway, Kapolei, HI (US); Douglas MacPherson, Ontario (CA); Carl B. Melanson, Ontario (CA)

( * ) Notice: Subject to any disclaimer, the term of this patent is extended or adjusted under 35 U.S.C. 154(b) by 323 days.

(21) Appl. No.: 12/807,865

(22) Filed: Sep. 15, 2010

Related U.S. Application Data (60) Provisional application No. 61/242,707, filed on Sep. 15, 2009.

(51) Int. Cl.
*B01J 8/02* (2006.01)
*C01B 31/08* (2006.01)

(52) U.S. Cl.
USPC ........... 422/198; 422/202; 422/203; 422/204; 422/205; 422/239; 202/99; 202/108; 201/2.5; 201/36

(58) Field of Classification Search
CPC .............................. C01B 31/088; C01B 31/10
USPC ......... 422/202, 203, 204, 205, 206, 238, 239; 202/99, 108; 201/2.5, 36, 37, 38, 40
See application file for complete search history.

(56) References Cited

U.S. PATENT DOCUMENTS

| | | | | |
|---|---|---|---|---|
| 1,565,129 A | * | 12/1925 | Wightman | 502/435 |
| 1,920,886 A | * | 8/1933 | Pier et al. | 208/107 |
| 1,942,021 A | * | 1/1934 | Du Chaffaut | 422/148 |
| 3,488,161 A | * | 1/1970 | Herp, Jr. | 422/148 |
| 3,875,077 A | * | 4/1975 | Sanga | 502/427 |
| 4,712,491 A | * | 12/1987 | Schmidt | 110/346 |
| 4,987,115 A | * | 1/1991 | Michel-Kim | 502/419 |
| 8,328,991 B2 | * | 12/2012 | Lurvey | 201/10 |

* cited by examiner

*Primary Examiner* — Jennifer A Leung
(74) *Attorney, Agent, or Firm* — William E. Noonan (57) ABSTRACT

An apparatus for providing activated carbon that has a reactor vessel for containing carbon based feedstock and a processor that encloses the reactor vessel. An insulating barrier is disposed between the reactor vessel and the processor for defining generally vertical outer and inner pathways that are communicably interconnected. The reactor vessel has a gas receiving intake port in communication with the inner pathway. First and second inlet conduits are formed through the processor and into the reactor for respectively introducing a first ignition gas into the reactor to ignite the feedstock and a second gas into the first pathway. The second gas circulates through the outer and inner pathways and enters the reactor vessel through the gas receiving intake port. The exhaust gas is circulated through a catalyst chamber/cartridge/bed. At least one exhaust port discharges gas from the vessel exteriorly of the processor.

20 Claims, 4 Drawing Sheets

APPARATUS AND METHOD FOR PRODUCING ACTIVATED CARBON

RELATED APPLICATION

This application claims the benefit of U.S. Provisional Application Ser. No. 61/242,707, filed Sep. 15, 2009.

FIELD OF THE INVENTION

The disclosure herein relates to an apparatus and process for producing activated carbon.

BACKGROUND OF THE INVENTION

Carbon has been used by mankind since the discovery of fire. Charcoal is a blackish residue consisting of impure carbon obtained by removing water and other volatile constituents from plastics, tires, rubber, animal and vegetation substances. Charcoal is usually produced by slow pyrolysis, the heating of wood, sugar, bone char, or other substances in an oxygen deprived atmosphere. The resulting carbon ranges in hardness and can be brittle, lightweight, black, porous material, which resembles coal. Charcoal produced in this manner is 65% to 98% carbon with the remainder consisting of volatile chemicals and ash.

Charcoal may be activated to produce activated carbon, which has an increased effectiveness as a filter. Activated carbon readily absorbs a wide range of organic compounds dissolved or suspended in gases and liquids. Charcoal or activated carbon is often used to filter water to remove bacteria and undesired tastes. In certain industrial process, such as the purification of sucrose from cane sugar, impurities cause an undesirable color, which can be removed with activated, carbon. Activated carbon is also used to absorb odors and toxins in gases, such as mercury. Charcoal or activated carbon filters are also used in some types of gas masks. In medical uses, activated carbon is mainly exploited for its capacity to absorb poisons. In addition, activated carbon can be used to reduce discomfort and embarrassment due to excess gas in the digestive tract. Charcoal is often classified by its properties and the grade of porosity of activated carbon can depend on the properties of the charcoal starting material and method of activation.

The production of activated carbon begins with the production of charcoal. Making charcoal is a lengthy process wherein biomass is typically slowly smoldered in a pile over several days. The charcoal is then cooled in an inert atmosphere. Activated carbon is then produced by removing hydrocarbons and materials from the opening structure of the charcoal with steaming, chemical treatment or a combination thereof. These steps are time consuming and expensive.

During the process of making charcoal, a synthetic gas, which can be a mixture including carbon dioxide, nitrogen, methane, carbon monoxide and hydrogen is produced as a waste product. During the late 1800's synthetic gas was used in Europe to provide heating and power generation using charcoal and peat as a feed material. During World War II, the shortage of petroleum lead to a renewed interest in synthetic gas. It was estimated that over 500,000 vehicles were running on such gas. This gas can be burned as a fuel or converted to a petroleum substitute by means of a Fischer-Tropsch process. That process features a catalyzed chemical reaction in which synthesis gas is converted into liquid hydrocarbons of various forms. Often, catalysts based on iron and cobalt are utilized in the process, although nickel and ruthenium have also been used. The principal purpose of this process is to produce a synthetic petroleum substitute for use as synthetic lubrication oil or as synthetic fuel. This synthetic fuel can be used to run trucks, cars and some aircraft engines. The use of diesel is increasing in recent years.

A Fischer-Tropsch process involves a variety of chemical reactions, which lead to a series of products. The reactions include those resulting in the formation of alkanes. These can be described by chemical equations of the form:

$$(2n+1)H_2 + nCO \rightarrow C_nH_{(2n+2)} + nH2O$$

where n is a positive integer. The simplest of these (n=1), results in formation of methane. Process conditions and catalyst composition can be chosen to favor higher order reactions where (wherein n>1). Alkanes produced in this manner can be straight-chained and branched alkanes. In addition to alkane formation, other reactions result in the formation of alkenes, as well as alcohols and other oxygenated hydrocarbons. Another reaction in a Fischer-Tropsch process is the water gas shift reaction:

$$H_2O + CO \rightarrow H_2 + CO$$

This reaction results in formation of $CO_2$, which can be used to shift the $H_2:CO_2$ ratio of incoming synthesis gas.

The process also allows for the use of catalyst to produce the Sabatier reaction. This can be used to elevate the production of methane, which allows for the gas to be used in a wider variety of internal combustion engines. The Sabatier reaction, which was discovered by the French chemist Paul Sabatier, involves passing the synthetic gas over a catalyst to produce methane and water as follows:

$$CO_2 + 4H_2 \rightarrow CH4 + 2H_2O$$

SUMMARY OF THE INVENTION

It is therefore an object of the present invention to provide an apparatus and method for efficiently producing activated carbon in a manner that is faster, safer and more commercially viable than has been previously possible using conventional systems.

It is a further object of this invention to provide an apparatus and method for efficiently producing a synthesis gas that may be collected for later use as a fuel or used effectively in a Fischer-Tropsch process, Sabatier process and other applications.

This invention features an apparatus for producing activated carbon including a reactor vessel having an interior chamber for containing carbon based feedstock. There is a processor for receiving and enclosing the reactor vessel. An insulating barrier is disposed between the reactor vessel and the processor for defining a generally vertical outer gas circulating pathway between the processor and the barrier and a generally vertical inner gas circulating pathway between barrier and the reactor vessel. The inner and outer gas circulating pathways are communicably connected and the reactor vessel has at least one gas receiving intake port that communicably interconnects the interior chamber of the reactor vessel with the inner gas circulating pathway. A first inlet conduit is formed through the processor in communication with the interior chamber of the reactor vessel for introducing a first ignition gas into the reactor vessel to ignite the feedstock. A second inlet conduit is formed through the processor and in communication with the outer gas circulating pathway for introducing a second combustion regulating gas into the outer gas circulating pathway. The second gas circulates through the outer and inner gas circulating pathways and enters the reactor vessel through one or more gas receiving intake ports.

At least one exhaust conduit communicates with the interior chamber of the reactor vessel and is formed through the processor for exhausting gas produced by the combusted feedstock within the reactor vessel through a removable catalyst bed.

In a preferred embodiment, the apparatus further includes a perforated grate mounted within the reactor vessel for supporting the feedstock thereon. The reactor vessel and the processor may include respective spaced apart cylindrical side walls. The barrier may include a cylindrical wall interposed between the reactor vessel side wall and the processor side wall to define the inner and outer pathways. The gas receiving intake port may include one or more inclined openings formed proximate an upper end of the reactor vessel. The reactor vessel may include curved exterior protrusions that direct the second gas to move in a swirling pattern about an outer surface of the reactor vessel. A heat reflective plate may be attached to a lower end of the reactor vessel. A catalyst bed may be used under the reflector plate.

The first gas may include compressed air. The second gas may include at least one of compressed air and steam. The inlet conduits may include respective inlet valves that selectively open and close the inlet conduits. The exhaust conduit may include an exhaust valve for selectively opening and closing the exhaust conduit. The second inlet conduit may include a valve that is operatively connected to a source of compressed air and responsive to an oxygen sensor for delivering a programmed amount of compressed air through the second inlet conduit to the outer pathway. The exhaust valve may be operably connected to an $O_2$ and/or a CO sensor. A counterflow exhaust conduit may extend through the processor and communicate with the interior chamber of the reactor vessel for exhausting gas from the reactor vessel prior to ignition of the feedstock. A counterflow conduit valve may selectively open and close the counterflow conduit. A temperature sensor may close the counterflow valve when the ignition temperature exceeds a predetermined level. A source of quenching steam may be selectively connected to the first inlet conduit to quench the combustion process when a predetermined amount of the feedstock has been combusted.

This invention also features a method for producing activated carbon. A carbon based feedstock is provided and carbonization of the carbon based feedstock in a reactor vessel is induced by exposing the feedstock to a first gas having a temperature sufficient to ignite the feedstock. A second gas including oxygen is transmitted into the carbon based feedstock. The oxygen content in the reactor vessel is monitored and the oxygen content is maintained preferably between 1.5% and 3.8% of atmospheric levels by adjusting the rate in which the second gas is transmitted into the vessel containing the carbon based feedstock for the production of syngas. The oxygen content in the reactor vessel is monitored and the oxygen content is maintained preferably between 1.5% and 5.8% of atmospheric levels by adjusting the rate in which the second gas is transmitted into the vessel containing the carbon based feedstock for the production of methane. Steam is added to quench the carbonization and activate the carbonized carbon based feedstock. This process may be performed by using the apparatus described above.

DETAILED DESCRIPTION OF PREFERRED EMBODIMENTS

Other objects, features and advantages will occur from the following description of a preferred embodiment and the accompanying drawings, in which.

Certain terminology is used in the following description for convenience only and is not limiting. The words "right", "left", "top" and "bottom" designate directions in the drawings to which reference is made. The words "a" and "one", as used in the claims and in the corresponding portions of the specification, are defined as including one or more of the referenced item unless specifically stated otherwise.

As used herein, "carbonization" refers to making carbon black, char or charcoal from a reactant material, which is preferably a carbon based feedstock.

A process to produce activated carbon is provided in which a reactant material, preferably a carbon based feedstock, is loaded into a reactor vessel. The carbon based feedstock can be provided as or derived from a number of sources including inorganic carbon or biomass. Biomass/inorganic mass includes, but is not limited to, woody and herbaceous plant material, such as wood logs, slab, chips and bark; and agricultural residues such as corncobs, corn stover, wheat straw, nutshells and sugar cane bagasse. Biomass may also include the inorganic/organic tires, plastics, fractions of municipal and/or commercial/industrial solid wastes, sewage sludge, manure or other excrement and the residues of animal husbandry, such as bones and carcasses.

The reactor vessel is then loaded into a processor and the carbon based feedstock is ignited utilizing hot gas, flame or other source of ignition plumbed into the bottom of the processor. Preferably, the reactor vessel and/or processor is purged with compressed air prior to ignition. Once the carbon based feedstock is ignited, the processor is preferably pressurized with compressed gas, preferably air, which is metered into the processor. The pressure within the reactor is preferably 50 to 150 psi and more preferably 150 psi, but may be allowed to vary between 20 and 200. The oxygen content within the reactor vessel and/or the processor can be at atmospheric levels or maintained at a concentration between zero percent oxygen and atmospheric level. The oxygen content is preferably below 7%, more preferably at 1.5% to 3.8%, and even more preferably at 3.8% of the standard atmospheric levels. The standard atmospheric level of oxygen is 20.95% by volume. Standard atmospheric air, when dry, contains roughly (by volume) 78.08% nitrogen, 20.95% oxygen, 0.93% argon, 0.038% carbon dioxide and trace amounts of other gases. Exhaust gases are passed through a catalyst bed and then released, preferably through the bottom of the processor and optionally captured downstream. The temperature at the most active point of carbonization within the reactor vessel is preferably at or above 250° C., more preferably at 400° C. to 900° C., more preferably at 600° C. to 850° C. and more preferably at 800° C. to 850° C. The process is continued until a desired endpoint and a desired endpoint may be, but is not limited to, the point at which the carbon based feedstock is i) converted to black carbon, char or charcoal, or ii) reduced in mass to a level equal to approximately 50% or less of the original carbon based feedstock mass. The process is then quenched with steam and the remaining heat from the process superheats the steam to drive hydrocarbons off and activate the carbon. The reactor vessel is then removed from the processor and the activated carbon can be removed from the reactor vessel. Another reactor vessel containing carbon based feedstock can be loaded into the processor. Or the original reactor vessel can be filled again with carbon based feedstock and loaded back into the processor. In this way, the process to make activated carbon can be facilitated in a series of one step batch processes.

The process for the conversion of biomass to activated carbon can be utilized further to produce black oil, diesel and synthesis gases. Steam can be injected at low metered rates during the process. The exhaust from the process includes hydrogen and carbon monoxide, methane, carbon dioxide and nitrogen which form synthesis gases, and these can be burned off, used to fuel other processes, or utilized in a Fischer-Tropsch process to produce liquid hydrocarbons or through the Sabatier process to enhance methane production. The process flows are reversible, allowing gas to flow upward and downward, to allow conversion from downdraft to updraft. Steam is injected at the end of the cycle to quench carbonization and activate the carbon with an amount of steam within the range of 1-200 lbs. steam per minute per 3 tons original carbon based feedstock. Preferably, the amount of steam for quenching and activation is within the range of 10-200 lbs. steam per 3 tons original carbon based feedstock in increments of one lb. steam within this range. Hydrocarbons are removed from the flue gas and filtered. Remaining flue gas (synthetic gas) is compressed and stored and/or can be drawn through a catalytic reactor and converted to liquid fuel and stored.

Figure 1:
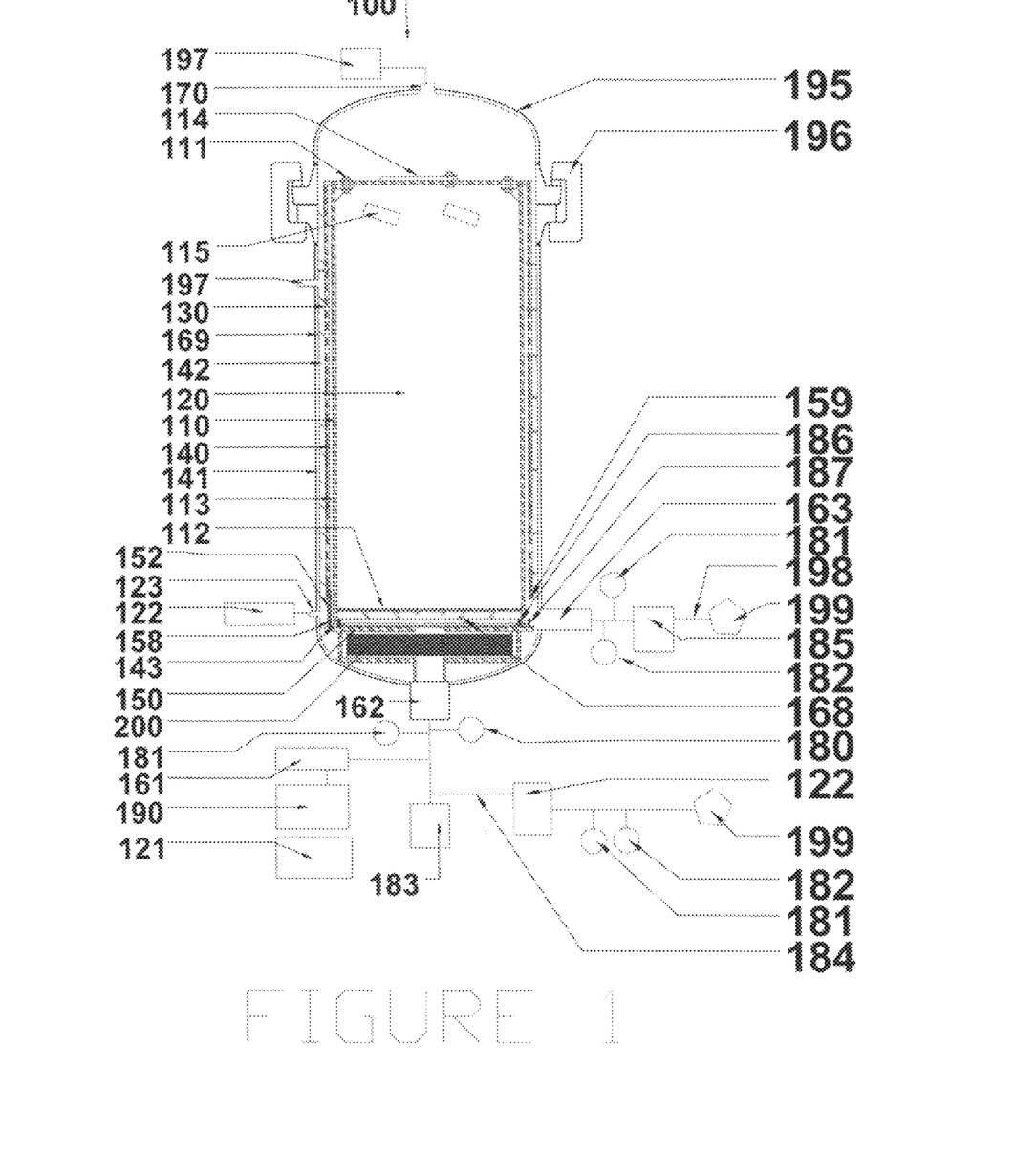
FIG. 1 is a cross sectional view depicting an apparatus in accordance with this invention that can be used to make activated carbon, synthesis gas, provide vapor or steam, or provide materials for making liquid hydrocarbons.

FIG. 1 illustrates a cross section of an apparatus 100 that can be used to make activated carbon and/or synthesis gas or to provide vapor, steam or material for making liquid hydrocarbons. If synthesis gas and/or vapor and/or steam is produced, the synthesis gas and/or vapor and/or steam can be used to drive an engine or produce electricity. Preferably, apparatus 100 includes a reactor vessel 110 for containing carbon based feedstock 120. Reactor vessel 110 includes a first reactor vessel end 111 and a second reactor vessel end 112, a reactor vessel wall 113 and reactor vessel cover 114. The reactor vessel cover 114 can be reversibly sealed to the first end 111 of the reactor vessel or displaced (opened) to place the carbon containing feedstock 120 into the reactor vessel 110. The lower second end may be defined by a grate or support platform welded to wall 113 and upon which feedstock is deposited.

The reactor vessel 110 is preferably a vertical cylinder with a wall 113, which is optionally perforated with second gas receiving ports 115. The wall 113 can be a single cylindrical wall. Alternatively, the reactor vessel 110 can have more than one wall 113. A cylindrical insulated barrier 130 may be provided about reactor vessel 110. Still more preferably, a generally cylindrical first gap 140 exists between the insulated barrier and reactor vessel 110. Preferably, the first gap 140 is 1-6 inches in width, which is measured from the reactor vessel wall 113 to the surface of the insulated barrier proximal to the reactor vessel 110.

Optionally, an internal reflector plate 150 can be attached to the bottom of the processor 141, which can be used to reflect heat from the reactor vessel 110. The reactor vessel 110 and insulated barrier 130 are within a processor or autoclave 141 and a second gap 142 may separate the insulated barrier 130 and processor 141. The processor also includes a wall 169. The wall 169 can be a single cylindrical wall. Alternatively, the processor 141 can have more than one wall 169. Preferably, the second gap is 1-6 inches in width, which is measured from the processor 141 wall 169 to the surface of insulated barrier 130 proximal to the processor 110.

Barrier 130 defines a second shell suspended above the reflector plate 150 at points around an outer ring 158. Standoff plates 152, 153, 154, 155, 156 and 157 are welded or otherwise secured (as represented by plate 152 in FIG. 1) between barrier 130 and wall 110 at the lower end of the vessel 110. The standoff plates are likewise attached to an outer circumference 158 of reflector plate 150, FIGS. 2-3B, such that plate 150 is suspended from the lower end of the reactor vessel. The reflector plate 150 sits on top of an optional removable catalyst bed/chamber or cartridge 200. In other versions a different number of plates may be included. The bottom 159 of the barrier 130 is thereby separated from the reflector plate 150 to allow airflow between the barrier 130 and the reactor vessel 110. The airflow may be utilized to serve as a thermal insulation layer as well as a means to pre-heat gas or air prior to its entry into the reactor vessel 110. The reflector plate 150 may also include louvered fins 168 to form cyclonic air flows from the reactor vessel to the catalyst chamber/bed/cartridge 200.

The reactor vessel, reflector plate, catalyst chamber/bed/cartridge and processor can be made of any suitable material that is compatible with the reactions. Preferably, one or more of the processor, reactor vessel and reflector plate are made of carbon steel, stainless steel and/or ceramic.

A first gas or vapor can be injected into the reactor vessel 110 through a first conduit 161 (FIG. 1) connected to a port 162, which is preferably at the bottom of the apparatus 100. The first gas is preferably air and the vapor is preferably steam. Standard atmospheric air, when dry, contains roughly (by volume) 78.08% nitrogen, 20.95% oxygen, 0.93% argon, 0.038% carbon dioxide and trace amounts of other gases and the first gas may include standard atmospheric air. The first gas can also include one or more gaseous elements, gaseous compounds or mixtures thereof. Gas or vapor can also be injected or drawn out through one or more optional side ports 163. These optional side ports 163 can be used to control the process or activate the carbon at the end of the cycle. A second gas valve 170 is located preferably at the top of the apparatus 100 and more preferably, a second gas transmitted through valve 170 enters the first gap 140. The second gas is preferably air but in some embodiments the content of oxygen is the second gas is different than that found in air. Standard atmospheric air, when dry, contains roughly (by volume) 78.08% nitrogen, 20.95 oxygen, 0.93% argon, 0.038% carbon dioxide and trace amounts of other gases, and the second gas may include standard atmospheric air. The second gas can also include one or more gaseous elements, gaseous compounds or mixtures thereof.

The second gas is preferably circulated such that it flows downward in the gap 142 toward the bottom of the reactor vessel 110. After reaching the bottom of the reactor vessel 110, the second gas can be redirected to flow upward and then into the reactor vessel 110 through port 115. Through this process, the second gas can be heated to the appropriate temperature before encountering the carbon based feedstock 120. Preferably, the second gas is heated to 100° C. to 200° C. before encountering the carbon based feedstock. The circulating air can also provide additional insulation so that the exterior of the apparatus has a lower temperature during operation. To facilitate this airflow, the reactor vessel 110 and/or the insulated barrier 130 can be reversibly and sealably associated with the processor 141. Preferably, the reversible and sealing association prevents airflow between the bottom of the reactor vessel and the processor 141. Preventing airflow can include completely blocking airflow or reducing airflow.

Preferably, the percent of the air flowing through the reversible and sealing association is zero or essentially zero.

In an embodiment, not shown, the insulated barrier 130 extends under the reflector plate 150 supports. In this embodiment, the first gap extends between the extended portion of the insulated barrier 130 (not shown) and the reactor vessel 110. Also, the port 162, when positioned on the bottom of the apparatus 100 extends from the processor 141, through the insulated barrier 130 and into the reactor vessel 110. In addition, the bottom of the reactor vessel 110 can be reversibly and sealably associated with the insulated barrier 130 to prevent airflow around the bottom of reactor vessel 110. Preventing airflow can include completely blocking airflow or reducing airflow. A high temperature gasket may be provided as a means of the reversible and sealing association. A preferred means to provide the reversible and sealing association is to include a bed of silica, ceramic or ceramic wool. In this embodiment, a preferred means to provide the reversible and sealing association is to include a bed of silica in the portion of the first gap 140 between the bottom of the reactor vessel 110 and the insulated barrier 130. Examples of silica materials that can be utilized in the bed of silica include, but are not limited to, sand and/or glass particles. Examples of silica materials that can be utilized in the bed include, but are not limited to, sand and/or glass particles. Preferred sizes of the materials are in the range of 1.180 to 0.212 mm in diameter. A medium grade silica sand may be used as in the bed 143. Preferably, silica sand in the bed 143 has a mesh size of 16-70 (sieve size 1.180 to 0.212 mm).

As shown in FIG. 1, when reflector plate 150 is utilized, the reversible and sealing association of the reactor vessel 110 and processor 141 can be provided between the reactor vessel 110 and the reflector plate 150 and extending into the first gap 140. Preferably, the means of reversible and sealing association can be provided on reflector plate 150 and the reactor vessel 110 is set on a bed 143 such that the means occupies a position under the reactor vessel 110 and in the first gap 140 toward the second end of the reactor vessel. More preferably, the means is disposed in bed 143 formed between inner and outer sealing rings 186, 187 respectively. A high temperature gasket may be provided as a means of the reversible and sealing association. A preferred means to provide the reversible and sealing association is to include a bed 143 of silica, ceramic or ceramic wool between the reactor vessel 110 and the processor 141. Examples of silica materials that can be utilized in the bed 143 include, but are not limited to, sand and/or glass particles. Preferred sizes of the materials are in the range of 1.180 to 0.212 mm in diameter. A medium grade silica sand may be used as in the bed 143. Preferably, silica sand in the bed 143 has a mesh size of 16-70 (sieve size 1.180 to 0.212 mm).

Figure 2:
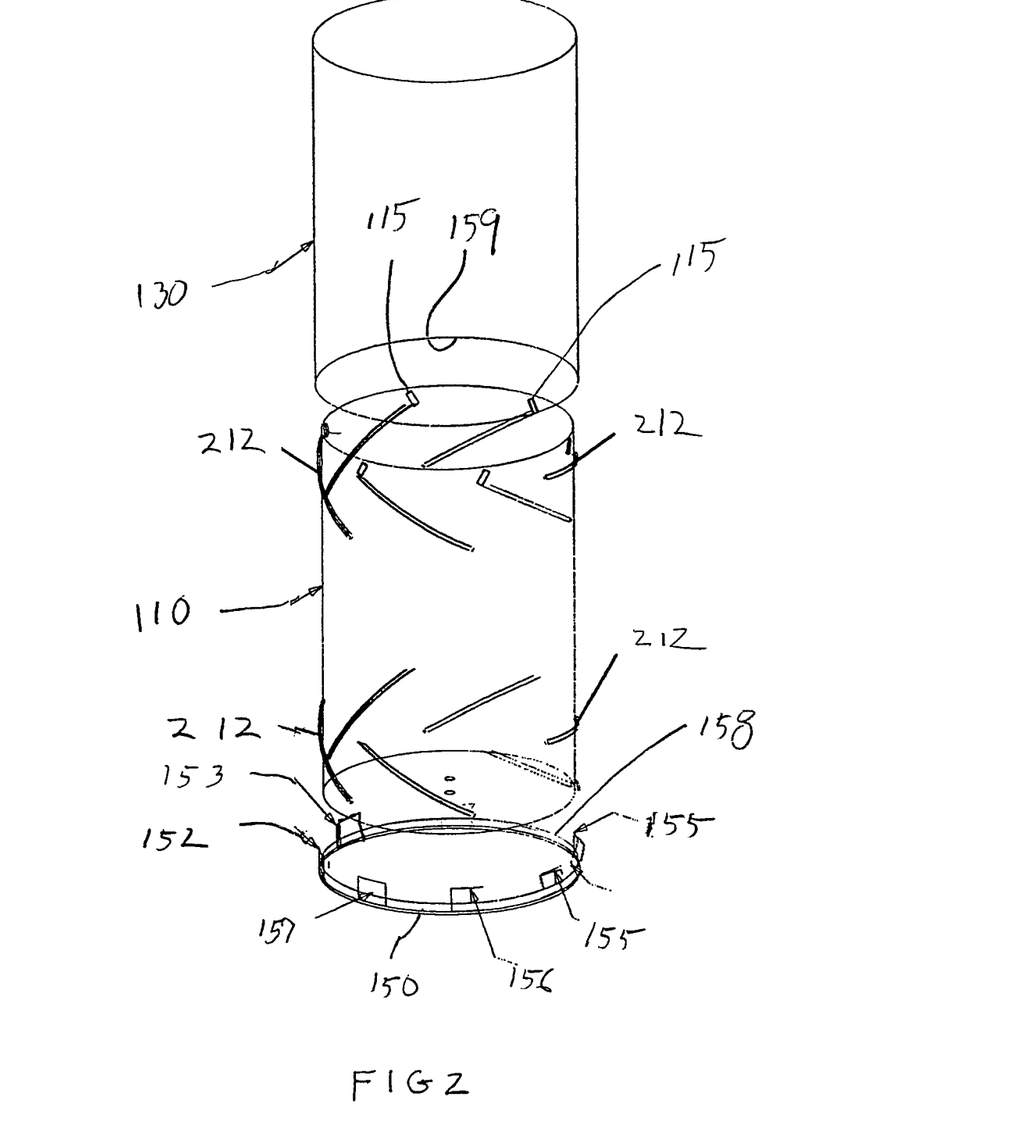
FIG. 2 is an exploded view of a preferred reactor vessel with exterior protrusions.
Figure 3A:
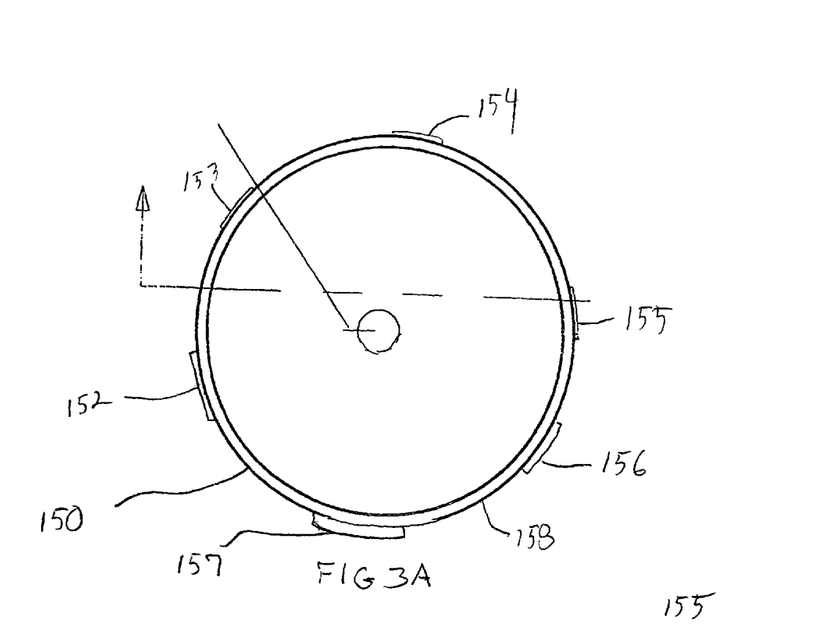
FIG. 3A is a top plan view illustrating a preferred reflector plate.
Figure 3B:
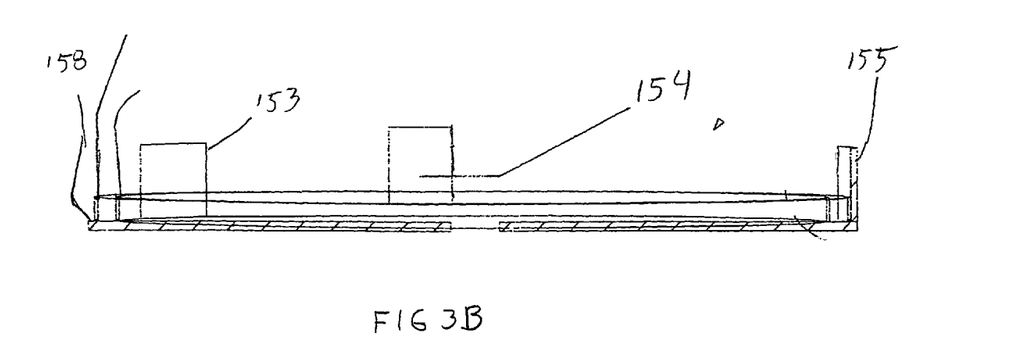
FIG. 3B is a cross section view of the reflector plate of FIG. 1.

Optional second gas receiving ports 115 are illustrated in FIGS. 1 and 2. After air has been transmitted into the gap 140, the second gas receiving ports are positioned to allow airflow from the gap 140 into the carbon based feedstock. In some embodiments, a reactor vessel cover or processor cover are contemplated. One or more second gas receiving ports can be utilized if a reactor vessel cover or processor cover closes or partially closes the top of the reactor vessel. One or more second gas receiving ports can also be utilized in the absence of one or more of the reactor vessel or processor covers.

A pressure gauge 180, temperature gauges 181 and gas gauge 182 may be provided on one or more air inlets 183 and one or more outlets 184 of both the air and process flue gas. Outlets 184 are disposed in the processor wall. Gas can be removed from one or more of the outlets 184. Gas can also be drawn from the reactor vessel through port 162. The temperature of gas drawn from an outlet port 184 at valve 185 is preferably above 250° C., more preferably 300° C. to 700° C., more preferably 400° C. to 600° C. and more preferably 600° C.

The carbon based feedstock 120 can be processed into shapes and sizes according to the characteristics of the biomass. A base material can be placed at the bottom of the canister to induce ignition during the start-up phase.

The first gas, compressed air, propane natural gas and/or syngas can be heated/ignited in chamber 190, which is connected to first conduit 161 and then introduced through port 162 to initiate ignition. Any type of heater capable of heating/igniting the first gas to a temperature high enough to ignite the carbon based feedstock is contemplated. Once combustion has been confirmed via sensors, the processor cover 195 is closed to preferably form a seal. A locking collar 196 may be provided and engaged to lock the apparatus 100 in the closed position.

The first gas is then introduced through either valve 197 or counterflow valve 185 and preferably the pressure is regulated at 150 psi. Process flows are regulated through valve 197 or counterflowed through valve 185.

The process is preferably continued with the addition of, steam metered through 123 until hydrocarbons are driven from the carbon based feedstock 120. This endpoint can be determined by analyzers 199, which can be used to monitor one or more of hydrogen, carbon monoxide, carbon dioxide, oxygen and methane levels. The endpoint for the reaction can also be determined by the carbon content left in the processors. The mass or weight of carbon left can be measured by an known method but preferably is through a mass or weight sensor located within the apparatus. Further, the feedstock mass or weight can be monitored throughout the process to maximize potential energy recovery. To this end, the carbon content can be determined prior to processing.

The process can be completed when a target carbon percentage is reached but other endpoints can be utilized. When the process is determined to be complete, steam is injected, preferably from steam source 121 through first conduit 161 connected to a port 162. To facilitate injection of steam, valves 122 and 185 may be opened and closed appropriately. Injecting steam at this stage increases the removal of hydrocarbons, ash and particles, increasing the porosity and area of the activated carbon. If desired, the processor is then returned to atmospheric conditions and the reactor vessel 110 is removed and the cycle starts over by refilling the reactor vessel 110 with a new batch of carbon based feedstock or providing a new reactor vessel containing carbon based feedstock. The catalyst chamber/cartridge/bed may also be changed if required during the refilling stage.

Referring to FIG. 2, a preferred reactor vessel 110 exterior is illustrated. As shown, the reactor vessel 110 can include exterior protrusions 212, preferably deflector plates, to facilitate the flow of the second gas across vessel 110. The exterior protrusions may be positioned such that the second gas swirls around the reactor vessel 110 downward toward the bottom. Then, upon reflecting upward, the gas can be directed in a swirling pattern around the reactor vessel 110 toward the top. Through this process, the second gas can be heated to the appropriate temperature before encountering the carbon based feedstock 120. The circulating air can also provide additional insulation so that the exterior of the apparatus has a lower temperature during operation.

The exhaust from the process includes synthesis gases. Such gases can be sent through the catalyst chamber/cartridge/bed and burned off, collected for later use as a fuel or utilized in a Sabatier and/or Fischer-Tropsch process to produce liquid hydrocarbons. To this end, the apparatus for the process includes a synthesis gas receiver, which may be an engine, gas tank or a compressor. Further, compressed synthesis gas may be retained in a compressed gas container.

The means to perform a Fischer-Tropsch can include any known structures and engineering processes. Preferably, a container holding an array of ceramic tubes and ceramic monoliths with reactants and/or catalysts is provided as at least a portion of the means and the process gas is flowed through the ceramic tubes or monoliths. The container can be configured to allow air and/or steam to be vented around the ceramic, without interfering with the flow of process gas through the tubes or monolith, to control the temperature, preferably between 150° C. and 320° C.

In a preferred embodiment, the process of making activated carbon takes 1-1.5 hours with 2.5-3 tons of carbon based feedstock, which preferably include material derived from biomass.

Figure 4:
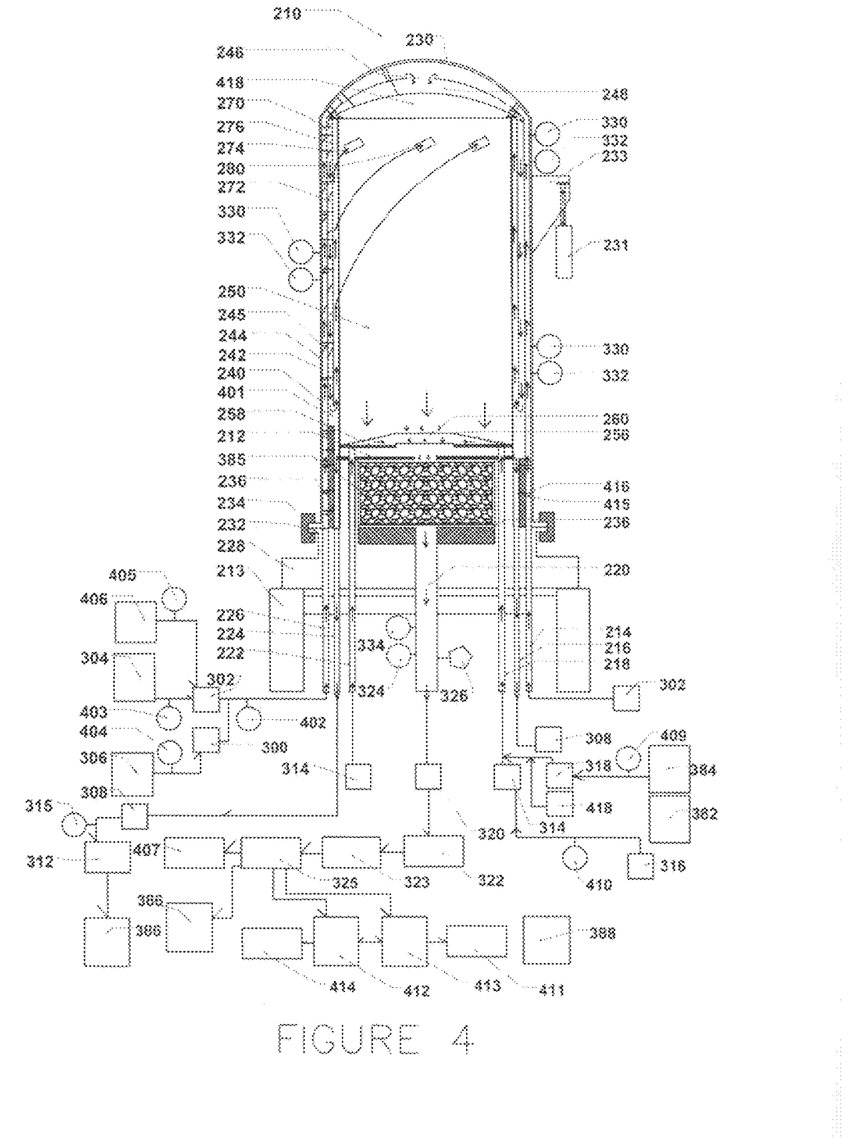
FIG. 4 is a cross sectional view of an alternative preferred apparatus for producing activated carbon in accordance with this invention.

There is shown in FIG. 4 a schematic view of an alternative carbon processing apparatus 210 according to this invention. Apparatus 210 includes a stainless steel base 228, through which ceramic coated pipes 214, 216, 218, 222, 224 and 226 are mounted vertically. The pipes introduce heated gases and steam into the apparatus and discharge or purge combustion product resulting from operation of apparatus 210. A reflector plate 212 is mounted above a catalyst bed 385. Each of the above described conduits 214-218 and 222-226 extends vertically through reflector plate 212. A conduit 220 extends through an insulating member 236 and terminates at the invert or bottom of the catalyst bed 385.

A processor comprising an outer shell or autoclave 230 is removably mounted upon base 228. Autoclave 230 includes a lower flange 232 that generally conforms to and sits upon on peripheral flange of base 228. A locking ring 234 is selectively engaged with the interengaging flanges to secure autoclave 230 to reflector base 228 and underlying base 213. An insulation member 236 is carried interiorly of autoclave 230 proximate the lower end of the autoclave. Outermost conduits 214 and 226, which are inlet conduits, extend through base 228 outwardly of insulation member 236. The remaining conduits 216, 218, 222 and 224 extend through insulating member 236 and terminate just above the upper surface of the reflector plate insulation member within the interior chamber of a reactor vessel 250.

Autoclave 230 includes a generally cylindrical exterior side wall having a dome shaped upper end. A similarly shaped inner shield 242 is spaced apart from outer wall 240 to provide a gap 244 therebetween. Shield 242 has an opening at the upper end thereof, which allows gap 244 to communicate the interior 248 of autoclave 230. The shield forms an insulating barrier between the outer processor or autoclave and the reactor 250 described more fully below. Fins or protrusions 245 are formed within gap 244 to provide a spiral circulation of gas within gap 244 when the activated carbon process is performed as described more fully below. Gap 244 thereby defines an outer gas circulating pathway.

Generally cylindrical reactor vessel 250 is removably mounted within interior chamber 246 of autoclave 230. Reactor vessel 250 may be optionally attached to the upper surface of insulation member 236. The reactor vessel encloses a grate 256, which is supported upon a one inch steel plate 258. Both plate 258 and grate 256 have ⅜" holes formed therethrough. In addition, a central flue 260 is formed through the grate. The biomass to be converted into activated charcoal is placed within reactor vessel 250 upon grate 256 and combusted in accordance with the process described below.

Reactor vessel 250 is spaced apart from insulating shield 242 by a peripheral space 270 of interior autoclave chamber 248. The reactor vessel itself includes an outer wall 272 that is separated from inner wall 274 by an interior gap 276. Spiral protrusions 275 may be formed between inner and outer walls 272 and 274 to allow gas to circulate upwardly through gap 276 in a generally spiral or swirling manner during operation of apparatus 210. Inclined ports 280 are formed through the inner wall 274 of the reactor vessel proximate the upper end of vessel 250.

A hydraulic ram 231 is mounted upon a guide rail or other support means (not shown) and operably connected to a bracket 233 attached to autoclave 230. Ram 231 is selectively operated to open and close the autoclave when locking ring 234 is disengaged. This allows the reactor vessel 250 to be removed from autoclave 230 to introduce feedstock into the reactor vessel as required. It should be understood that various other means may be used for opening and closing the autoclave or outer shell of the apparatus.

Outermost inlet conduits 214 and 226 are connected to respective inlet valves 300 and 302 which are selectively operated to add compressed air 304 and steam 306 to the reactor vessel as needed. Counterflow conduits 216 and 224, which comprise respective outlets, are connected through respective counterflow exhaust valves 308 and 310 to a scrubber or filter 312 in turn to a flare 386. Each of inlet conduits 218 and 222 is connected through an ignition valve 314 to an ignition source 316, which may itself comprise a hot gas/flame source in the form of various types of burners and heaters. Conduits 218 and 222 are also connected through a second inlet valve 318 to a source of compressed air, which may comprise previously described compressed air source 304 or a separate compressed air source. Conduits 218 and 222 are also connected through a second inlet valve 318 to a source of steam, which may comprise previously described steam source 382 or a separate steam source. Central exhaust conduit 220 is connected through a respective exhaust valve 320 to a scrubber 322. The output gas from scrubber 322 is sent to a filter 323 and then to a gas compressor 325 and then to a storage tank 407. Excess gas from scrubber 322 and gas compressor 325 can be diverted to flare 386. A sensor 324 monitors the level of oxygen within the reactor vessel through conduit 220. By the same token, a sensor 326 measures the level of carbon monoxide discharged through conduit 220. Temperature and pressure sensors 330 and 332 respectively are provided to measure the conditions within reactor vessel 250 and conduit 220 during operation of the activated carbon process. Each of the inlet and exhaust valves may be electronically programmed and controlled (through an appropriate microprocessor or alternative controller) to open and close in response to sensed conditions or in a programmed sequence. The types of valves and the manner of programming them should be understood by persons skilled in the art.

In operation, autoclave 230 is opened and reactor vessel 250 is removed therefrom. Feedstock is loaded into vessel 250 and an optional catalyst may be added to the feedstock and/or loaded into the catalyst chamber/cartridge/bed 385. Reactor vessel 250 is lowered onto reflector plate 212 and the autoclave 230 is lowered onto the reactor vessel by ram 231. Locking ring 234 is then operated to secure the reactor vessel and autoclave in place.

The carbon activation process is initiated by closing exhaust valve 320 and opening counterflow valve 308 for conduits 216 and 224. Compressed air valve 318 is opened to deliver compressed air 304 through conduits 218 and 222 into reactor vessel 250. This purges gas remaining in the autoclave and reactor vessel through counterflow conduits 216 and 224.

Flue gas is drawn through opened conduits 216 and 224 from the reactor vessel and delivered to a scrubber 312.

After purging is complete, the ignition cycle commences. Valve 314 is opened and ignition gas/flame is introduced through inlet conduits 218 and 222 into the reactor vessel. At the same time, valve 318 remains open as well to continue introducing compressed air 304 into the reactor vessel. This ignites the feedstock within the reactor vessel. When sensors 315 and 317 on conduits 216 and 218 detect that ignition has occurred (i.e. by the temperature/$O_2$ or CO of the flue gas), locking ring 234 is closed to seal the autoclave or reactor vessel shut upon the reflector plate and base. Valves 308, 314 and 318 are likewise closed, which stops the counter flow through intake conduits 218 and 222 and exhaust conduits 216 and 224.

Downdraft is initiated by opening valve 320 such that flue gas within the reactor vessel is exhausted through conduit 220. Valve 302 is opened to introduce compressed air 304 through conduits 214 and 226 into gap 244 between autoclave wall 240 and shield 242. This air circulates upwardly through the outer pathway formed by gap 244 and across fins 245. The compressed air enters interior chamber 248 of autoclave 230 through upper opening 246. From there, the introduced air circulates downwardly through the inner pathway defined by gap 270 between insulating shield 242 and outer wall 276 of reactor vessel 250. The air enters a circumferential inlet formed proximate the bottom of the reactor vessel and circulates upwardly through the circumferential space 276 between outer and inner walls 272 and 274 of reactor vessel 250. The air continues to circulate upwardly in a spiral or swirling pattern and enters the reactor vessel through inclined ports 280. As this process continues, $CO/O_2$ sensors 334 and 324 attached to conduit 220 and gas chromatograph CO sensor 326 connected to conduit 220 monitor the concentrations of oxygen, carbon monoxide, hydrogen, nitrogen, methane and hydrocarbons respectively in the reaction vessel. These valves 300, 302 and 320 are programmed to maintain the $O_2$ level within the reactor vessel to levels greater than 5% and less than atmospheric (20.95%). Preferably the $O_2$ level is held below 7% and, even more preferably maintained between 1.5 and 3.7 percent. The second gas thereby regulates combustion within reactor vessel 250.

As the feedstock is combusted, temperature and pressure within the reactor vessel are monitored by sensors 330 and 332 respectively. The temperature is allowed to reach approximately 800° C. Pressure is allowed to increase to approximately 150 psi. When these levels are reached, valve 302 is operated to introduce steam 306 into the reactor vessel through conduits 214 and 226. It should be understood that various appropriate types of microprocessors and electronic control systems may be used to control operation of valves 300 and 302 such that selected levels of compressed air and steam are added to the reactor vessel, as necessary, to maintain the temperature, pressure and oxygen levels within desired parameters. Preferably, the temperature is maintained between 400 C and 800 C and the pressure is maintained between 50 and 150 psi. These values may fluctuate between these preferred ranges in accordance with this invention. It should be understood that, in alternative embodiments, separate valves may be employed to introduce metered amounts of compressed air and steam respectively into the reactor vessel. Such alternative valve arrangements will be understood to persons skilled in the art.

The gas product produced during the reaction is exhausted through conduit 220 and directed to scrubber 322. From there, the exhaust gas is directed to a filter 323 and a compressor 325. The combustion reaction is allowed to continue within vessel 250 in the foregoing manner until approximately 45%-50% of the original feedstock has been combusted. The process can be continued until about 80% of the feedstock has been combusted.

After approximately one-half of the feedstock has been consumed (as determined by appropriate instrumentation recording increase in temperature, decrease in pressure and time, or alternatively by using an appropriate program and controller), the quenching process is commenced. Valves 300 and 302 are closed to halt the introduction of compressed air and steam into processor 230. Combustion gas exhaust valve 320 is likewise closed, whereas counterflow valve 308 is opened. Valve 418 connected to a quenching steam source 382 is also opened to introduce steam into reactor vessel 250 through conduits 218 and 222. It should be further understood that, in alternative embodiments, two or more of the valves 318, 314 and 418 connected to conduits 218 and 222 may be combined and controlled to introduce selected amounts of steam, compressed air and/or hot ignition gas into the reactor vessel as required. In addition, steam sources 306 and 382 may alternatively comprise a single source of steam, which is connected to either valves 302 and 380 respectively or to a single valve attached to conduits 218 and 222. In either case, during the quench process, steam is delivered through conduits 218 and 222 into reactor vessel 250 to quench the combustion cycle. Product gases are exhausted through counterflow conduits 216 and 224 and through open valve 308 to a scrubber 312, which filters the gaseous emissions. Scrubbers 312 and 322 may be combined in some versions of this invention.

The temperature of the gas exhausted through conduits 216 and 224 is measured, such as by temperature sensor 384 or, alternatively by temperature sensor 330 mounted within the reactor vessel. When the temperature is reduced to below 200 C, the activated charcoal production process is stopped. Valves 308 and 310 remain open such that the internal pressure within the reactor vessel and the processor autoclave drop to atmospheric pressure. Locking ring 234 is unlocked and ram 231 lifts autoclave 230 so that vessel 250 may be removed. Activated charcoal produced during the previously described process is removed from the vessel and a new supply of feedstock is added to the reactor vessel. As a result, the above described process may be repeated as required. It should be further understood that steam may also be introduced into the autoclave without a reactor vessel in place in order to steam clean the interior of the autoclave, catalyst chamber and process lines.

It will be understood by persons skilled in the art that the valves and sensors described herein may be connected through an appropriate microprocessor or other programmable electronic controls, which regulate operation of the process by opening and closing the valves in a programmed manner such that purging, combustion and quenching are performed in the manner described herein.

The processor of this invention enables activated charcoal to be produced much more quickly, safely and efficiently than has been accomplished by existing apparatuses. The circulation of compressed air and steam between the autoclave and the reactor vessel, as well as the use of the reflector plate prevents the outer autoclave from overheating. By introducing metered volumes of compressed air and steam, as needed, during the reaction, the oxygen, temperature and pressure levels of the combustion process are precisely regulated. The apparatus of the second disclosed embodiment, achieves results that are comparable to those provided by the first embodiment described herein. In particular, 2½ to 3 tons of carbon based feedstock may be combusted in a period of from 45 minutes to 2 hours in order to produce an activated carbon product. The output gases may be used effectively in various known types of Fischer-Tropsch processes, Sabatier processes and for assorted alternative applications such as fuel generation.

From the foregoing it may be seen that the apparatus of this invention relates to an apparatus and process for producing activated carbon. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

1. An apparatus for producing activated carbon comprising:
    a reactor vessel having an interior chamber for containing carbon based feedstock;
    a processor for receiving and enclosing said reactor vessel;
    an insulating barrier disposed between said reactor vessel and said processor for defining a generally vertical outer gas circulating pathway between said processor and said barrier and a generally vertical inner gas circulating pathway between said barrier and said reactor vessel, which inner and outer gas circulating pathways are communicably connected, said reactor vessel having at least one gas receiving intake port that communicably interconnects said interior chamber of said reactor vessel with said inner gas circulating pathway;
    a first inlet conduit formed through said processor and in communication with said interior chamber of said reactor vessel for introducing a first ignition gas into said reactor vessel to ignite said feedstock;
    a second inlet conduit formed through said processor and in communication with said outer gas circulating pathway for introducing a second combustion regulating gas into said outer gas circulating pathway, which second gas circulates through said outer and inner gas circulating pathways and enters said reactor vessel through said at least one gas receiving intake ports; and
    at least one exhaust conduit communicating with said interior chamber of said reactor vessel and formed through said processor for exhausting gas produced by the combustion of feedstock within said reactor vessel; said processor and said reactor vessel having respective feedstock access openings that are selectively uncovered for introducing feedstock into said interior chamber of said reactor vessel and covered for enclosing said interior chamber of said reactor vessel to combust feedstock therein.

2. The apparatus of claim 1 further including a perforated grate mounted within said reactor vessel for supporting the feedstock thereon.

3. The apparatus of claim 1 in which said reactor vessel and said processor includes respective spaced apart cylindrical side walls, said barrier including a cylindrical wall interposed between said reactor vessel side wall and said processor side wall to define said inner and outer pathways.

4. The apparatus of claim 1 in which said reactor vessel includes curved exterior protrusions that direct said second gas to move in a swirling pattern about an outer surface of said reactor vessel.

5. The apparatus of claim 1 in which said ignition gas includes compressed air.

6. The apparatus of claim 1 in which said second gas includes at least one of compressed air and steam.

7. The apparatus of claim 1 in which each said inlet conduit includes an inlet valve that selectively opens and closes said inlet conduit.

8. The apparatus of claim 1 in which said exhaust conduit includes an exhaust valve for selectively opening and closing said exhaust conduit.

9. The apparatus of claim 1 further including a counterflow exhaust conduit extending through said processor and communicating with said interior chamber of said reactor vessel for exhausting gas from said reactor vessel prior to ignition of the feedstock.

10. The apparatus of claim 9 further including a counterflow conduit valve that selectively opens and closes said counterflow conduit.

11. The apparatus of claim 1 further including a locking apparatus for securing said processor with said feedstock access opening of said processor in a covered condition.

12. The apparatus of claim 1 in which said processor includes a removable processor cover attached to a side wall of said processor for selectively covering and uncovering said access opening of said processor and said reactor vessel contained therein.

13. The apparatus of claim 1 in which said reactor vessel has a reactor vessel closure for selectively covering and uncovering said feedstock access opening of said reactor vessel.

14. An apparatus for producing activated carbon comprising:
    a reactor vessel having an interior chamber for containing carbon based feedstock;
    a processor for receiving and enclosing said reactor vessel;
    an insulating barrier disposed between said reactor vessel and said processor for defining a generally vertical outer gas circulating pathway between said processor and said barrier and a generally vertical inner gas circulating pathway between said barrier and said reactor vessel, which inner and outer gas circulating pathways are communicably connected, said reactor vessel having at least one gas receiving intake port that communicably interconnects said interior chamber of said reactor vessel with said inner gas circulating pathway;
    a first inlet conduit formed through said processor and in communication with said interior chamber of said reactor vessel for introducing a first ignition gas into said reactor vessel to ignite said feedstock;
    a second inlet conduit formed through said processor and in communication with said outer gas circulating pathway for introducing a second combustion regulating gas into said outer gas circulating pathway, which second gas circulates through said outer and inner gas circulating pathways and enters said reactor vessel through said at least one gas receiving intake port; and
    at least one exhaust conduit communicating with said interior chamber of said reactor vessel and formed through said processor for exhausting gas produced by the combustion of feedstock within said reactor vessel, said at least one gas receiving intake port including an inclined opening formed proximate an upper end of said reactor vessel.

15. An apparatus for producing activated carbon comprising:
- a reactor vessel having an interior chamber for containing carbon based feedstock;
- a processor for receiving and enclosing said reactor vessel;
- an insulating barrier disposed between said reactor vessel and said processor for defining a generally vertical outer gas circulating pathway between said processor and said barrier and a generally vertical inner gas circulating pathway between said barrier and said reactor vessel, which inner and outer gas circulating pathways are communicably connected, said reactor vessel having at least one gas receiving intake port that communicably interconnects said interior chamber of said reactor vessel with said inner gas circulating pathway;
- a first inlet conduit formed through said processor and in communication with said interior chamber of said reactor vessel for introducing a first ignition gas into said reactor vessel to ignite said feedstock;
- a second inlet conduit formed through said processor and in communication with said outer gas circulating pathway for introducing a second combustion regulating gas into said outer gas circulating pathway, which second gas circulates through said outer and inner gas circulating pathways and enters said reactor vessel through said at least one gas receiving intake port;
- at least one exhaust conduit communicating with said interior chamber of said reactor vessel and formed through said processor for exhausting gas produced by the combustion of feedstock within said reactor vessel; and
- a heat reflective plate attached to a catalyst chamber/cartridge/bed and a lower end of said reactor vessel.

16. An apparatus for producing activated carbon comprising:
- a reactor vessel having an interior chamber for containing carbon based feedstock;
- a processor for receiving and enclosing said reactor vessel;
- an insulating barrier disposed between said reactor vessel and said processor for defining a generally vertical outer gas circulating pathway between said processor and said barrier and a generally vertical inner gas circulating pathway between said barrier and said reactor vessel, which inner and outer gas circulating pathways are communicably connected, said reactor vessel having at least one gas receiving intake port that communicably interconnects said interior chamber of said reactor vessel with said inner gas circulating pathway;
- a first inlet conduit formed through said processor and in communication with said interior chamber of said reactor vessel for introducing a first ignition gas into said reactor vessel to ignite said feedstock;
- a second inlet conduit formed through said processor and in communication with said outer gas circulating pathway for introducing a second combustion regulating gas into said outer gas circulating pathway, which second gas circulates through said outer and inner gas circulating pathways and enters said reactor vessel through said at least one gas receiving intake port; and
- at least one exhaust conduit communicating with said interior chamber of said reactor vessel and formed through said processor for exhausting gas produced by the combustion of feedstock within said reactor vessel; each said inlet conduit including an inlet valve that selectively opens and closes said inlet conduit; said inlet valve of said second inlet conduit being operably connected to a source of compressed air and to an oxygen sensor that selectively operates said inlet valve to deliver a programmed amount of compressed air through said second inlet conduit to said outer pathway.

17. An apparatus for producing activated carbon comprising:
- a reactor vessel having an interior chamber for containing carbon based feedstock;
- a processor for receiving and enclosing said reactor vessel;
- an insulating barrier disposed between said reactor vessel and said processor for defining a generally vertical outer gas circulating pathway between said processor and said barrier and a generally vertical inner gas circulating pathway between said barrier and said reactor vessel, which inner and outer gas circulating pathways are communicably connected, said reactor vessel having at least one gas receiving intake port that communicably interconnects said interior chamber of said reactor vessel with said inner gas circulating pathway;
- a first inlet conduit formed through said processor and in communication with said interior chamber of said reactor vessel for introducing a first ignition gas into said reactor vessel to ignite said feedstock;
- a second inlet conduit formed through said processor and in communication with said outer gas circulating pathway for introducing a second combustion regulating gas into said outer gas circulating pathway, which second gas circulates through said outer and inner gas circulating pathways and enters said reactor vessel through said at least one gas receiving intake port; and
- at least one exhaust conduit communicating with said interior chamber of said reactor vessel and formed through said processor for exhausting gas produced by the combustion of feedstock within said reactor vessel, said exhaust conduit including an exhaust valve for selectively opening and closing said exhaust conduit, said exhaust valve being operably connected to a CO sensor.

18. An apparatus for producing activated carbon comprising:
- a reactor vessel having an interior chamber for containing carbon based feedstock;
- a processor for receiving and enclosing said reactor vessel;
- an insulating barrier disposed between said reactor vessel and said processor for defining a generally vertical outer gas circulating pathway between said processor and said barrier and a generally vertical inner gas circulating pathway between said barrier and said reactor vessel, which inner and outer gas circulating pathways are communicably connected, said reactor vessel having at least one gas receiving intake port that communicably interconnects said interior chamber of said reactor vessel with said inner gas circulating pathway;
- a first inlet conduit formed through said processor and in communication with said interior chamber of said reactor vessel for introducing a first ignition gas into said reactor vessel to ignite said feedstock;
- a second inlet conduit formed through said processor and in communication with said outer gas circulating pathway for introducing a second combustion regulating gas into said outer gas circulating pathway, which second gas circulates through said outer and inner gas circulating pathways and enters said reactor vessel through said at least one gas receiving intake port;
- at least one exhaust conduit communicating with said interior chamber of said reactor vessel and formed through said processor for exhausting gas produced by the combustion of feedstock within said reactor vessel;
- a counterflow exhaust conduit extending through said processor and communicating with said interior chamber of said reactor vessel for exhausting gas from said reactor vessel prior to ignition of the feedstock;

a counterflow conduit valve that selectively opens and closes said counterflow conduit; and a temperature sensor for closing the counterflow valve when the ignition temperature exceeds a predetermined level.

19. An apparatus for producing activated carbon comprising:

a reactor vessel having an interior chamber for containing carbon based feedstock;

a processor for receiving and enclosing said reactor vessel;

an insulating barrier disposed between said reactor vessel and said processor for defining a generally vertical outer gas circulating pathway between said processor and said barrier and a generally vertical inner gas circulating pathway between said barrier and said reactor vessel, which inner and outer gas circulating pathways are communicably connected, said reactor vessel having at least one gas receiving intake port that communicably interconnects said interior chamber of said reactor vessel with said inner gas circulating pathway;

a first inlet conduit formed through said processor and in communication with said interior chamber of said reactor vessel for introducing a first ignition gas into said reactor vessel to ignite said feedstock;

a second inlet conduit formed through said processor and in communication with said outer gas circulating pathway for introducing a second combustion regulating gas into said outer gas circulating pathway, which second gas circulates through said outer and inner gas circulating pathways and enters said reactor vessel through said at least one gas receiving intake port; and at least one exhaust conduit communicating with said interior chamber of said reactor vessel and formed through said processor for exhausting gas produced by the combustion of feedstock within said reactor vessel; a source of quenching steam being selectively connected to said first inlet conduit to quench the combustion process when a predetermined amount of feedstock has been combusted.

20. An apparatus for producing activated carbon comprising:

a reactor vessel having an interior chamber for containing carbon based feedstock;

a processor for receiving and enclosing said reactor vessel;

an insulating barrier disposed between said reactor vessel and said processor for defining a generally vertical outer gas circulating pathway between said processor and said barrier and a generally vertical inner gas circulating pathway between said barrier and said reactor vessel, which inner and outer gas circulating pathways are communicably connected, said reactor vessel having at least one gas receiving intake port that communicably interconnects said interior chamber of said reactor vessel with said inner gas circulating pathway;

a first inlet conduit formed through said processor and in communication with said interior chamber of said reactor vessel for introducing a first ignition gas into said reactor vessel to ignite said feedstock;

a second inlet conduit formed through said processor and in communication with said outer gas circulating pathway for introducing a second combustion regulating gas into said outer gas circulating pathway, which second gas circulates through said outer and inner gas circulating pathways and enters said reactor vessel through said at least one gas receiving intake port; and at least one exhaust conduit communicating with said interior chamber of said reactor vessel and formed through said processor for exhausting gas produced by the combustion of feedstock within said reactor vessel, said processor enclosing a catalyst chamber/cartridge/bed in communication with an interior of said reactor vessel and through which said exhausted gas is circulated, said at least one exhaust conduit communicating with said interior of said reactor vessel and said catalyst chamber/cartridge/bed for exhausting said gas product by the combustion of feedstock therethrough.

* * * * *